United States Patent
Berner

[11] Patent Number: 5,786,000
[45] Date of Patent: Jul. 28, 1998

[54] CONTINUOUS MOLDING MACHINE WITH PUSHER

[76] Inventor: Rolf E. Berner, R.D. #6, New Castle, Pa. 16103

[21] Appl. No.: 705,904

[22] Filed: Aug. 28, 1996

[51] Int. Cl.⁶ .......................... B29C 44/36; B29C 47/10
[52] U.S. Cl. .................. 425/140; 425/376.1; 425/377; 425/378.1; 425/817 C
[58] Field of Search .................. 425/4 C, 376.1, 425/377, 378.1, 140, 817 C; 264/45.4; 100/214, 215

[56] References Cited

U.S. PATENT DOCUMENTS

| | | |
|---|---|---|
| Re. 27,964 | 4/1974 | Berner . |
| 3,178,768 | 4/1965 | Edberg . |
| 3,383,441 | 5/1968 | Norrhede et al. . |
| 3,408,690 | 11/1968 | Jacob . |
| 3,422,178 | 1/1969 | Junker et al. . |
| 3,501,558 | 3/1970 | Munters et al. . |
| 3,594,461 | 7/1971 | Jacob . |
| 3,773,452 | 11/1973 | Taga . |
| 3,888,608 | 6/1975 | Holl . |
| 3,971,838 | 7/1976 | Yazawa . |
| 3,986,918 | 10/1976 | Berner . |
| 4,096,220 | 6/1978 | Berg . |
| 4,332,754 | 6/1982 | Meunier et al. . |
| 4,358,418 | 11/1982 | Heggenstaller .............. 425/376.1 |
| 4,379,107 | 4/1983 | Berner . |
| 4,432,713 | 2/1984 | Berner . |
| 4,539,167 | 9/1985 | Schedel .................. 425/4 C |
| 4,681,524 | 7/1987 | Ikeda et al. ............ 425/376.1 |
| 4,822,542 | 4/1989 | Kuwabara et al. ............ 425/140 |
| 5,213,686 | 5/1993 | Funk et al. ............... 425/376.1 |
| 5,236,655 | 8/1993 | de Soet ..................... 264/320 |
| 5,248,459 | 9/1993 | Fukasawa et al. .......... 425/140 |
| 5,252,054 | 10/1993 | Ehnert et al. ............ 425/376.1 |
| 5,277,852 | 1/1994 | Spydevold ................ 425/4 C |
| 5,411,697 | 5/1995 | McGraw et al. ............. 264/294 |
| 5,413,745 | 5/1995 | Andersson ................... 264/68 |
| 5,505,886 | 4/1996 | Baugh et al. ............ 264/DIG. 69 |
| 5,585,122 | 12/1996 | Drum et al. .............. 425/182 |

FOREIGN PATENT DOCUMENTS

| | | | |
|---|---|---|---|
| 2543292 | 4/1976 | Germany .............. 425/140 |
| 2180497 | 4/1987 | United Kingdom .............. 425/140 |

*Primary Examiner*—Allan R. Kuhns
*Attorney, Agent, or Firm*—Andrew J. Cornelius

[57] ABSTRACT

A continuous molding machine molds heat sensitive thermoplastic material into a finished product. The material is fed into a mold from a source through a mold inlet that is defined by the mold. The cross-sectional shape of the mold is chosen to conform to the desired cross-sectional shape of the product that is being molded. An endless conveyor and a pusher force the material through the mold. Heating apparatus heats the material as it passes through the mold. As it is heated, it conforms to the shape of the mold and, therefore, to the desired shape of the product. Cooling apparatus cools the mass after it is heated and formed to ensure that the mass remains dimensionally stable as it exits the mold. The finished, molded product exits the mold through the mold outlet that is defined by the mold.

7 Claims, 3 Drawing Sheets

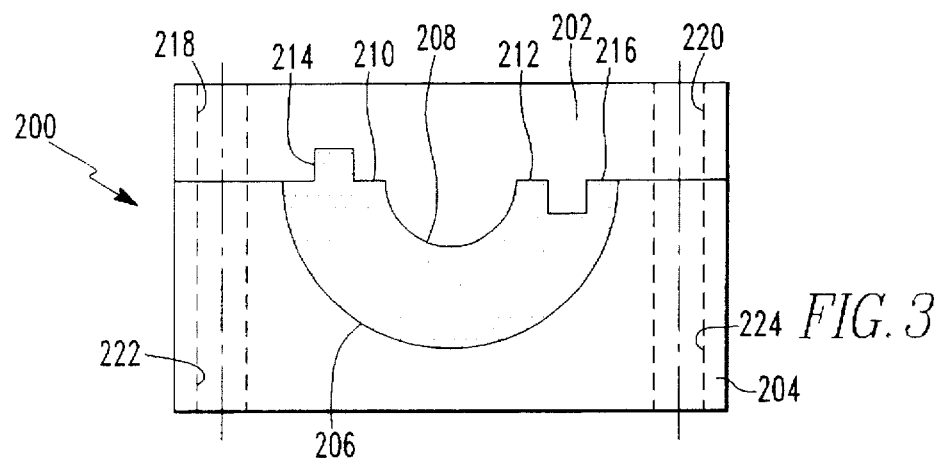
FIG. 3
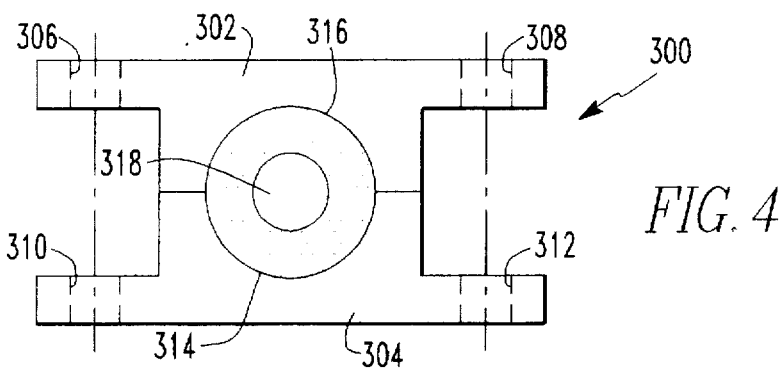
FIG. 4
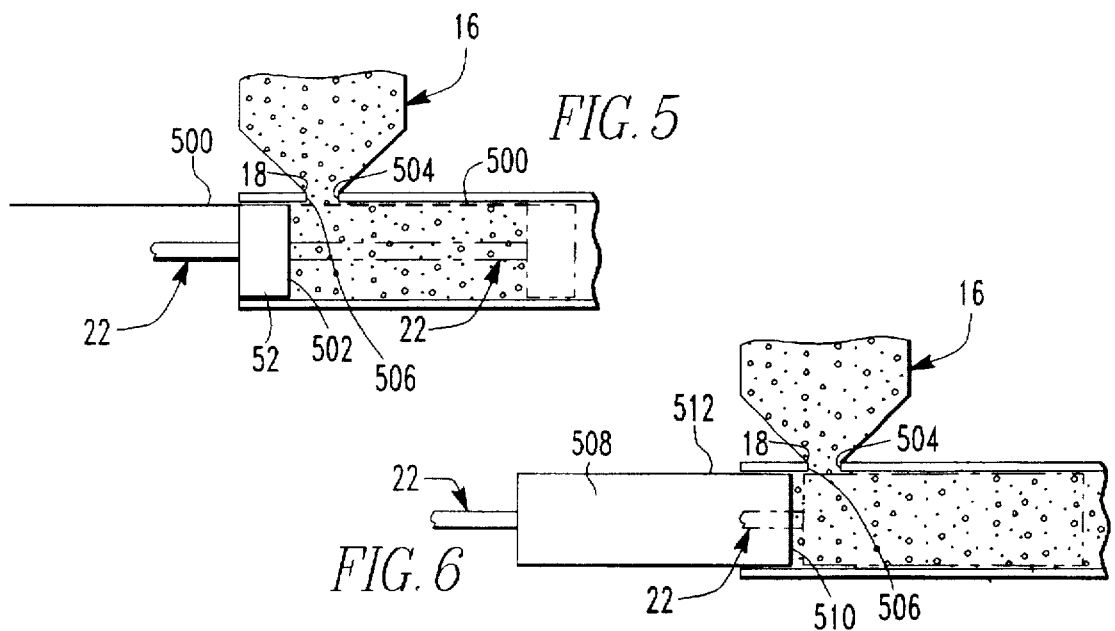
FIG. 5
FIG. 6

CONTINUOUS MOLDING MACHINE WITH PUSHER

BACKGROUND OF THE INVENTION

The present invention relates to the molding of products and, more particularly, to a machine and method for continuously molding products from such heat sensitive thermoplastic material as heat expandable plastic particles.

Heat sensitive thermoplastic material, like heat sensitive plastic pellets and beads and heat expandable plastic beads, are used to mold various types of products. For example, heat expandable beads are used to make EPS foam board, foam insulation sheets, insulation for siding for houses, packing for certain types of products that are shipped in containers, and pipe insulation. These products are formed in a continuous molding process that employs a molding machine. Generally, the heat expandable beads are deposited from a source of beads onto a continuous conveyor belt that carries the beads into and through a molding chamber. Each bead contains an expanding agent that is activated by heat. When it is activated, the expanding agent causes the beads to expand. Heat is applied to the beads as they are carried through the mold by the conveyor to activate the expanding agent and expand the beads. As the beads expand, they exert force against the walls of the mold and fuse with each other as the entire mass of beads is confined. The mass assumes the shape of the mold and forms the finished product. The formed mass is cooled before it exits the mold to ensure that it remains dimensionally stable. U.S. Pat. No. 4,432,713 shows a continuous molding machine and process, in which beads are deposited from a bag onto an endless conveyor by gravity and the conveyor pulls the beads through the mold. U.S. Pat. No. 4,432,713 is incorporated by reference herein.

The cross sectional shape of the mold must replicate the cross sectional shape of the product that is to be formed. Foam board and insulation products typically have a simple rectangular cross section, and the molds that are used to form these products have matching rectangular cross sections. Other types of products like insulation for siding and container packing have more complicated cross sections. The cross sections of the molds for forming these products must have more complicated cross sections that replicate those of the products. Additionally, inserts having various shapes may be located in the molds to form voids and otherwise influence the shape of the final product and to save material.

The density of the material forming the final product must, of course, be controlled. Density control begins with the pre-expansion process. The overall density of the material forming the product can be influenced by the nature and amount of the expanding agent that is remaining in the beads after pre-expansion. That is, the more expanding agent that remains in the raw material, the more dense the material forming the final product. Certain areas of some products should, however, have a greater density than other areas. For example, the edges of foam insulation sheets should be stronger, and, therefore, more dense, than other sections of the sheets to reduce damage and breakage during the handling and installation of the sheets. This is particularly important when the edges define tongue and groove sections. Also, certain parts of pipe insulation should be stronger, and more dense, than other parts. Pipe insulation completely surrounds the pipe, and is formed in two sections. Each section covers approximately one-half of the circumference of the pipe. Each section defines a tongue and groove arrangement that mates with the tongue and groove sections of the other insulation section when the two sections are joined together around the pipe. Preferably, the sections of the insulation that form the tongue and groove sections should be stronger than the remaining areas of the insulation since they are narrow and, therefore, more susceptible to breakage.

Those sections of products that need to be stronger than other sections could be made more dense by using beads with an expanding agent that provides a greater degree of expansion. This approach would also, however, make the entire product stronger and more dense than necessary. It would, therefore, consume more material, and make the product heavier and more expensive to produce than is necessary. It would be desirable, therefore, to use a continuous molding process and machine that allows for the molding of a product that has sections of different density and strength. Known machines and processes for continuously molding products, including those disclosed in U.S. Pat. No. 4,432,713, are not conducive to making products with sections that are more dense and stronger than other sections.

Additionally, current continuous molding machines and techniques are less than completely effective in forming products that require molds having small areas, since the expanding beads will not fill the small areas completely. For example, the endless conveyor belts used by the current techniques cannot fill completely the small areas of the molds that form the tongue and groove sections of pipe insulation molds. The expansion of the beads under the application of heat is not sufficient to force the beads completely into these small areas. If the mold is not completely filled, the molding process does not work, since steam will escape from the mold through the inlet and outlet of the mold. Similarly, current techniques cannot be used to produce products from molds that have large dimensions. For example, container packing for refrigerators requires the use of a mold where the distance between the conveyor and the top of the mold is large. In this instance, the mold cannot be completely filled using the conveyor belt only. Finally, current techniques cannot be used to produce certain types of products that are very small or that must be made of material having a very high density, like paper spools for calculators and registers.

Current techniques also cannot be used effectively if the material from which the product is formed is a mixture of new beads and reground scrap material or if all reground scrap is employed. There is very little, if any, expansion agent remaining in scrap material since the expansion agent was exhausted during the initial formation of the material into a product, when its expansion agent was activated and, most likely, completely spent.

There is, therefore, a need for an improved continuous molding machine and process that can be used to form products with sections that have varying strength and density. There also is a need for such a machine and process that can be used to form products having a greater variety of cross-sectional shapes, and to form products with a mixture of new beads and reground scrap material and all scrap material.

SUMMARY OF THE INVENTION

The present invention provides apparatus for continuously molding heat sensitive thermoplastic material into a product, including a molding chamber that defines an inlet and an outlet, a feed system that is adapted to feed the material to the molding chamber inlet, a pusher defining a head that is positioned to push the material, the pusher and the molding chamber cooperating to force the material through the molding chamber, the product exiting the molding chamber outlet, and heating apparatus that heats the material in the molding chamber. The cross-sectional shape of the molding chamber replicates the desired cross-sectional shape of the product. Preferably, the apparatus includes a reciprocating system that causes the pusher and the molding chamber to reciprocate relative to each other. The reciprocating system can reciprocate the pusher or the molding chamber or both. The apparatus can include a conveyor onto which the material is deposited, the conveyor helping the pusher to convey the material through the molding chamber. Preferably, the shape of the pusher head replicates the shape of the cross section of the product, or the shape of the cross section of a part of the product. More than one pusher can be provided.

The feed system can include a container that defines an outlet through which heat expandable particles may pass from within the container, and a valve or shutter that controls the passage of particles from the container into the molding chamber. The apparatus also may include cooling apparatus that cools the material after it is heated by the heating apparatus. The molding chamber may include inserts for forming voids in the product. Several pushers may be used that push different parts of the material as it travels through the molding chamber.

The present invention also provides apparatus for continuously molding heat expandable particles into a product, including a molding chamber that defines an inlet and an outlet, a feed system that is adapted to deliver heat expandable particles into the molding chamber through the molding chamber inlet, a pusher defining a head that is positioned to push the heat expandable particles and force them through the mold, a conveyor system that conveys the particles through the molding chamber, a reciprocating system that reciprocates the pusher relative to the molding chamber to force the particles through the molding chamber, and heating apparatus that heats heat expandable particles in the molding chamber, the product exiting the molding chamber through the molding chamber outlet.

The present invention also provides a method of continuously molding heat sensitive thermoplastic material into a product, including the steps of feeding the material into a molding chamber that defines an inlet and an outlet, forcing the material through the molding chamber with a pusher, and heating the material in the molding chamber, the product exiting the molding chamber through the molding chamber outlet. The pusher can define a head that contacts the material as the pusher forces the material through the molding chamber.

BRIEF DESCRIPTION OF THE DRAWINGS

The following detailed description of the preferred embodiments can be understood better if reference is made to the attached drawing, in which:

FIG. 3 is a front view of a mold that is used to produce a section of piping insulation;

FIG. 4 is a front view of a mold that is used to produce a paper spool

FIG. 5 is a schematic view of part of the apparatus shown in FIG. 1 in which the mold inlet valve has been replaced by a shutter that is mounted to the pusher; and FIG. 6 is a schematic view of part of the apparatus shown in FIG. 1 in which the function provided by the mold inlet valve is provided by a pusher that has an elongated head.

DETAILED DESCRIPTION OF THE PREFERRED EMBODIMENTS

Figure 1:
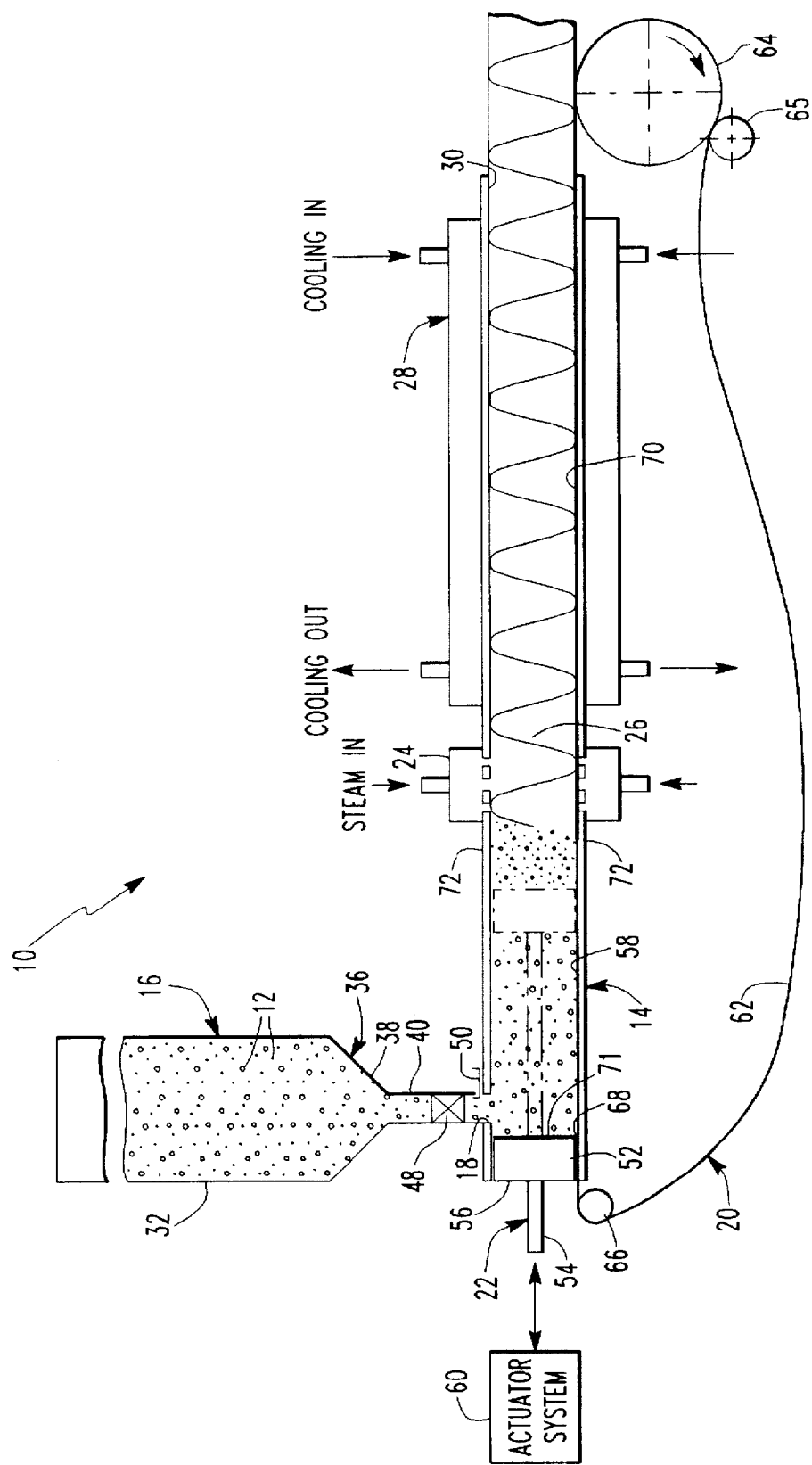
FIG. 1 is a side sectional view of the molding apparatus provided by the present invention.

FIG. 1 shows the continuous molding machine 10 that is provided by the present invention. Machine 10 molds heat sensitive thermoplastic material into a finished product. The heat sensitive material may be heat expandable beads that include an expanding agent that expands the beads upon the application of heat to the beads. Alternately, the material may consist of pellets or beads that do not have an expansion agent, but that soften and fuse to each other upon the application of heat. Machine 10 will be described herein as used to mold heat expandable plastic beads having an expansion agent.

Generally, beads 12 are fed into a mold 14 from a source 16 of beads through a mold inlet 18 that is defined by mold 14. Mold 14 may be constructed of aluminum and its interior surface may be coated with polytetrafluoroethylene, for example, a TEFLON tape, that facilitates the movement of material through mold 14. The cross-sectional shape of mold 14 is fabricated and built to replicate the desired cross-sectional shape of the product that is being molded. As is well known, beads 12 include an expanding agent such as pentane that is activated upon the application of heat. These heat expandable beads and their use are well-known in the trade, and they will not be discussed in greater detail herein. An endless conveyor 20 and a pusher 22 force beads 12 through mold 14.

Heating apparatus 24 heats the beads 12 using steam as they travel through mold 14. As the beads are heated, the expanding agent in beads 12 is activated, which causes beads 12 to expand and form an expanding mass 26. As the mass 26 of beads 12 expands, it is confined by the walls of mold 14, which forms mass 26 to the shape of the desired product. Cooling apparatus 28 cools mass 26 after it is heated but before it exits mold 14 to ensure that mass 26 remains dimensionally stable after it exits mold 14. The finished, molded product exits mold 14 through an outlet 30 that is defined by mold 14.

Pusher 22 includes a head 52 and a rod 54 that is secured to the rear surface 56 of head 52. Head 52 of pusher 22 is located in molding chamber 58 of mold 14, and is adapted to reciprocate with rod 54 within molding chamber 58. Head 52 cooperates with mold 14 and conveyor 20 to force beads 12 into and through molding chamber 58. An actuator system 60, for example an air cylinder, reciprocates pusher 22 within molding chamber 58 between the forward or fully extended position shown in broken lines in FIG. 1 and the fully retracted position shown in solid lines. Alternately, an hydraulic cylinder may be used as actuator 60. In any event, actuator 60 is used to adjust the speed, force, cycling time or frequency of reciprocation of pusher 22. As pusher 22 moves toward its fully extended position, head 52 forces beads into and through molding chamber 58. As head 52 moves to its fully retracted position, more beads fill the space between head 52 and the mass 26 that has already been forced into molding chamber 58. Actuator system 60 can be any suitable, known mechanical, pneumatic or hydraulic system that reciprocates pusher 22. Alternately, pusher 22 can be stationary with respect to mold 14, and system 60 can reciprocate mold 14 to cause beads 12 to be forced through molding chamber 58.

The head 52 of pusher 22 has a cross-sectional shape that conforms to the section of the product that it will force through molding chamber 58. More than one pusher 22 or head 52 may be used to form different sections of the product, or one pusher 22 with separate heads 52 may be used, depending on the nature of the product. Any combination of pushers may be used. For example, a main pusher that pushes part of the mass 26 can be provided along with a smaller pusher that pushes a different part of mass 26.

Generally, pusher 22 can be used to achieve several objectives. First, the areas of mass 26 that are pushed by head or heads 52 will be more dense and, therefore, stronger than those that are not pushed by a head 52. Thus, heads 52 may be provided that push those sections of mass 26 that are on the edges of molding chamber 58 and that will form the edges of the product. Accordingly, boards and sheets with edges that are stronger than the remaining sections of the product may be formed. Similarly, heads 52 that have cross-sections that conform to the tongue and groove sections of molding chamber 58 may be used to form pipe insulation with tongue and groove sections that are stronger than the remaining sections of the insulation sections. Also, where the density and strength of the entire product must be high, for example, a paper spool for a calculator or a cash register, the cross-sectional shape of the head can conform to the cross-sectional shape of the entire product.

Second, heads 52 can be provided for restricted areas of products to ensure that expanded beads are forced into all the areas of molding chamber 58. For example, heads 52 for the tongue and groove sections of pipe insulation will ensure that expanded beads will fill the tongue and groove sections completely. Also, a head 52 that replicates the overall shape of a molding chamber 58 for refrigerator packing that has a large distance between the inner surfaces of the bottom and top of molding chamber 58 will ensure that expanded beads are forced completely to the top of the molding chamber 58.

Bead source 16 includes a conventional container 32, which is, preferably a conventional bag made from a suitable fabric or cloth that holds the supply of beads 12. Lower section 36 of container 32 defines sections 38 and 40, which channel beads to a conventional material inlet 48, through which beads flow to mold inlet 18. Material inlet 48 may be a gravity feed with which beads from container 32 are gravity fed to inlet 18. Alternately, inlet 48 can include a venturi that blows beads 12 into inlet 18, or a mechanical pusher that forces beads toward inlet 18. Inlet 18 includes any conventional valve 50 that closes when pusher 22 moves forward into molding chamber 58 to stop the flow of beads through inlet 18 into molding chamber 58. Valve 50 opens when pusher 22 is retracted to the position shown in solid lines in FIG. 1, to permit more beads to enter molding chamber 58 and fill the space between pusher 22 and the material forming mass 26 that was pushed into molding chamber 58 with previous strokes of pusher 22. The dimensions of the components of apparatus 10, and the operation of pusher 22 and valve 50 should ensure that the front of mold 14 between the forward surface 71 of head 52 and mass 26 is completely filled before the flow of beads is stopped by the movement of pusher 22.

Conveyor system 20 is optional. That is, pusher 22 is sufficient to force beads 12 and mass 26 through molding chamber 58. Where a conveyor 20 is not provided, a suitable low friction surface, for example a TEFLON surface or tape, may be applied to the interior surfaces of mold 14 and molding chamber 58. Where a conveyor 20 is provided, it can be a conventional endless belt conveyor system that includes an endless drive belt 62 that is wrapped around a rubber covered pull or drive roll 64 and a stationary bar 66 and that passes through molding chamber 58 from mold opening 68 through mold outlet 30 along floor 70 of molding chamber 58. Belt 62 may be perforated to permit a heating medium to enter molding chamber 58 through belt 62 and heat beads 12. In instances where the heating medium enters molding chamber 58 through the sides or top only, belt 62 need not be perforated.

A conventional pinch roll 65 is provided, and belt 62 passes between pinch roll 65 and drive roll 64. As is well-known, pinch roll 65 pushes belt 62 against drive roll 64 to provide the friction that is needed to permit drive roll 64 to drive belt 62. The position of pinch roll 65 is adjustable to permit adjustment of the friction between roll 64 and belt 62. Generally, both bar 66 and roll 64 have a length equal to the width of molding chamber 58. Roll 64 is the drive roll, and is rotated in the clockwise direction by any suitable conventional drive system (not shown). Thus, belt 62 pulls beads 12 and mass 26 through molding chamber 26 as roll 64 rotates. A suitable conveyor system is shown in U.S. Pat. No. 4,432,713, which is incorporated by reference herein. As is well-known, in instances where molding chamber 58 is particularly thick, it may be desirable to use two belts, one along the upper surface of molding chamber 58, and another along lower surface 70 of molding chamber 58.

Conventional heating apparatus 24 is mounted to the outer surface 72 of mold 14, and heats beads 12 that are being conveyed through molding chamber 58 with a suitable heating apparatus and medium. Any suitable conventional system used in known continuous molding machines can be used to apply heat to beads 12. Suitable heating media can include steam, hot air and microwaves, and heat applied to the exterior of mold 14. Heating apparatus 24 can be the steam chest shown in U.S. Pat. No. 4,432,713, which patent is incorporated herein by reference. Heating apparatus 24 heats beads 12 to activate their expansion agent and expand beads 12. As beads 12 expand, the walls of molding chamber 58 confine them, beads 12 begin to fuse together and mass 26 begins to form. As is well known, the heating media, in the form of steam, hot air or microwaves, can be introduced into molding chamber 58 through belt 62 (in which case belt 62 is perforated), through the sides of molding chamber 58, through the top of molding chamber 58, or in any desired combination of the foregoing.

Similarly, cooling apparatus 28 is mounted to surfaces 72 of mold 14, and cools mass 26 before it exits molding chamber 58 as the finished product. Cooling apparatus 28 can be any suitable cooling apparatus used in the continuous molding of heat-expandable beads, including the apparatus mounted in the cooling area of the apparatus shown in U.S. Pat. No. 4,432,713. Cooling apparatus 28 cools mass 26 to ensure that it remains dimensionally stable as it exits molding chamber 58. As is well known in the trade, cooling apparatus 28 is not needed in machines that have a molding chamber 58 that has a length that is sufficient to allow mass 26 to cool sufficiently before it exits molding chamber 58.

Figure 2:
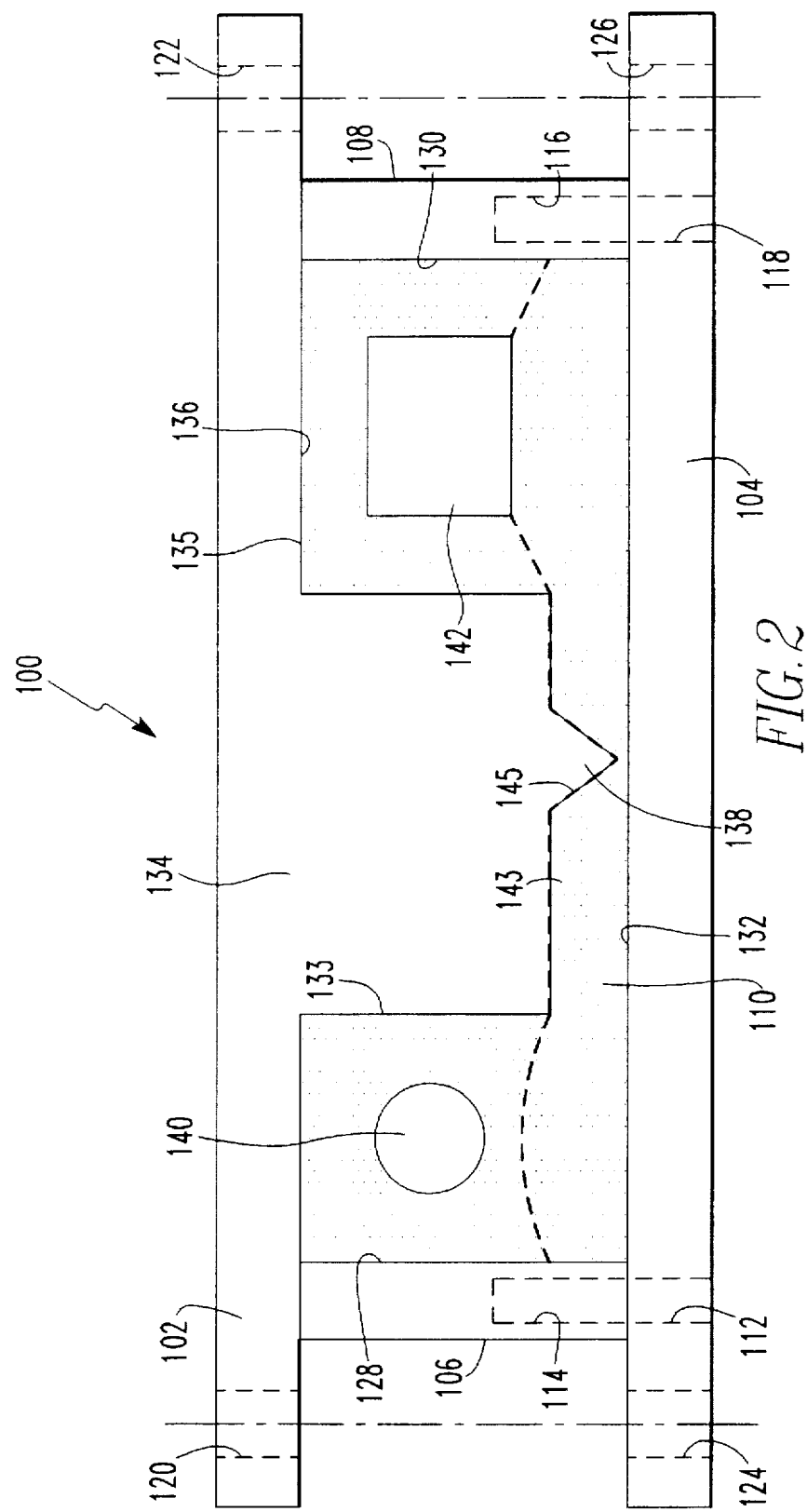
FIG. 2 is a front view of a mold that is used to produce packing for a refrigerator container.

The cross-sectional shape of molding chamber 58 must conform to the cross-sectional shape of the product that is being molded. Inserts can be used to create voids in the product that is being molded. For example, the mold shown in FIG. 2 is used to create packing for a container used to ship a refrigerator. The packing 143 is broken apart at the weak section of the packing that is created by center notch 145 to form two corner packing pieces that are installed in two corners of the refrigerator box before the refrigerator is placed into the box. Mold 100 includes a top 102, a side 106, a side 108 and a bottom 104. The interior surfaces of these pieces define the overall shape of the refrigerator packing, which is shown by the cross-hatching 110. Sides 106 and 108 are mounted between top 102 and bottom 104 at generally right angles. Bottom 104 defines an unthreaded bore 112, and side 106 defines a threaded bore 114. Side 106 is mounted to bottom 104 by aligning bores 112 and 114 with each other, and threading a bolt (not shown) through bores 112 and 114. Similarly, side 108 defines a threaded bore 116 and bottom 104 defines an unthreaded bore 118. Side 108 is mounted to bottom 104 by aligning bores 116 and 118, and threading a bolt (not shown) through bores 116 and 118. Top 102 defines unthreaded bores 120 and 122, and bottom 104 defines threaded bores 126 and 124. Top 102 is mounted to bottom 104 and sides 106 and 108 by aligning bores 120 and 124, and threading a bolt (not shown) through bores 120 and 124, and aligning bores 122 and 126 and threading a bolt (not shown) through bores 122 and 126, to form the mold shown in FIG. 2. Thus, inner surfaces 128 and 130 of sides 106 and 108, respectively, form the planar sides of the refrigerator packing, and inner surface 132 of bottom 104 forms the planar bottom of the refrigerator packing.

Top 102 of mold 100 defines projection 134, which depends from inner surface 136 of top 102. Projection 134 forms a cutout in the refrigerator packing. Projection 134, in turn, defines extension 138, which forms the notch in the bottom of the refrigerator packing. Additionally, mold 100 employs a pair of inserts 140 and 142, which are used to form voids in the refrigerator packing. Inserts 140 and 142 are supported within the molding chamber 58 in any suitable, known fashion.

Mold 100 is significant in that it cannot be used with a conveyor system alone. Unless a pusher is used to compact and redistribute the mass of expanded beads, the beads will not fill the mold completely, particularly corner sections 133 and 135, and the beads will be blown out of mold 100 from both its ends. Accordingly, the beads would expand only to the area shown between surface 132 of bottom 104 and the broken line shown in FIG. 2, and then only for a short period of time before it would collapse. Thus, the refrigerator packing would be ill-formed.

A mold 200 for pipe insulation is shown in FIG. 3. Mold 200 includes a top 202 and a bottom 204. Top 202 defines a pair of unthreaded bores 218 and 220, and bottom 204 defines a pair of threaded bores 222 and 224. Top 202 and bottom 204 are joined together by aligning bore 218 with bore 222 and aligning bore 220 with bore 224, and threading bolts (not shown) through bores 218, 220, 222 and 224. Bottom 204 defines a curved surface 206 that forms the outer curved surface of one section of the pipe insulation. Top 202 of mold 200 defines a curved surface 208 that forms the curved inner surface of the insulation section. Top 202 also defines surfaces 210 and 212, which form the "tongue and groove" sections of the pipe insulation sections that mate with each other when the sections are joined together around the piping. Surface 210 defines recess 214, which forms the tongue for the insulation section, and surface 212 defines projection 216, which forms the groove section of the insulation section. If a continuous molding machine that did not have a pusher would be used with mold 200 to attempt to form a pipe insulation section, few, if any, beads would be forced into the tongue and groove sections of mold 200, bead material would be blown from both ends of mold 200, and the pipe insulation section would not be properly formed.

Accordingly, a pusher 22 is used that has a head 52 that is aligned with and has a cross-section that has the same shape as the cross-section of the tongue and groove sections defined by mold 200. Alternately, two pushers 22 or heads 52 could be used, one for each of the tongue and groove sections. With the use of a pusher 22, sufficient expanded material will be compressed into the tongue and groove sections of the mold 200, even if the compressed material is static and clings to the interior walls of mold 200. Additionally, the pusher 22 could be made to force the material through the molding chamber 58 faster than belt 62 moves to ensure that the tongue and groove sections are stronger and denser than the remainder of the insulation section.

FIG. 4 shows a mold 300 that is used to form a spool to wind paper for such machines as calculators and cash registers. Mold 300 includes a top 302 and a bottom 304. Top 302 defines a pair of unthreaded bores 306 and 308, and bottom 304 defines a pair of threaded bores 310 and 312. Top 302 and bottom 304 are joined together by aligning bores 306 and 310, and aligning bores 308 and 312, and threading a pair of bolts (not shown) into bores 306, 308, 310 and 312. Bottom 304 defines a curved surface 314 that forms one half of the surface of the spool. Top 302 defines a curved surface 316 that forms the remaining half of the surface of the spool. A cylindrical insert 318 is mounted centrally of the cylindrical opening formed by surfaces 314 and 316, and is used to form a central cylindrical void in the spool. The void reduces the weight of the spool, and reduces the number of beads 12 required to form the spool. The spools for some calculators include a rod or pin that supports the spool.

Mold 300 cannot be used to make a spool by a continuous molding machine that does not have a pusher 22, and that relies only on a conveyor 20 to move the beads through molding chamber 58. First, belts 62 would be difficult to install and use with mold 300. Second, the spool requires high density for strength, which cannot be achieved by a conveyor system 20 alone. In fact, pusher 22 should be used to the exclusion of a conveyor 20.

The machine shown in FIG. 1 also permits controlling the density of the products produced. For example, the product that exits mold 14 can be cut to length and weighed. The result can be applied to system 60 that controls the reciprocation of the mold 14 or pusher 22, which can adjust the speed of reciprocation and the amount of force applied to pusher 22 or mold 14 to maintain a desired product weight. Additionally, the tamping action of pusher 22 allows the heat-expanded beads to spring back and fill in any pockets without disturbing the bonds that are being formed between the beads as they are being subjected to heat in molding chamber 58.

During operation of machine 10 shown in FIG. 1, beads begin to feed into mold 14 through inlet 18, as pusher 22 begins to move toward its fully extended position until the space between pusher 22 and mass 26 is filled. When head 52 reaches inlet 18, valve 50 closes inlet 18 to prevent beads from entering mold 14 behind head 52. Upon reaching its fully extended position, pusher 22 stops and reverses direction to begin moving toward its fully retracted position. When head 52 clears inlet 18, valve 50 opens to permit beads to begin filling the space between head 52 and mass 26. When pusher 22 reaches its fully retracted position, it stops, reverses direction, and begins to repeat the cycle.

FIG. 5 shows a pusher 22 having a head 52 to which a shutter 500 is mounted that extends toward the rear of pusher 22. Shutter 500 replaces valve 50 shown in FIG. 1. As pusher 22 moves toward the fully extended position shown in broken lines in FIG. 5 and reaches edge 506 of inlet 18, it begins to restrict the flow of beads through inlet 18. When surface 502 reaches edge 504 of inlet 18, the flow of beads through inlet 18 is stopped completely. The flow of beads through inlet 18 is prevented by shutter 500 once head 52 moves past edge 504 toward the fully extended position. On the return stroke of pusher 22, pusher 22 moves toward the fully retracted position. Once head 52 begins moving across inlet 18, the flow of beads through inlet 18 resumes. When surface 502 of head 52 reaches edge 506 of inlet 18, the full flow of beads through inlet 18 is resumed, and continues until the space between surface 502 and mass 26 is filled.

FIG. 6 shows an alternative to valve 50 and shutter 500. In the device shown in FIG. 6, pusher 22 includes an elongated head 508. Head 508 begins to restrict the flow of beads through inlet 18 as soon as surface 510 of head 508 moves past edge 506 of inlet 18 during the initial part of its stroke when it is moving toward its fully extended position, which is shown in broken lines in FIG. 6. The flow of beads through inlet 18 is completely stopped by surface 512 of head 508 when surface 510 reaches edge 504 of inlet 18. On the return stroke, when pusher 22 is moving toward the fully retracted position that is shown in solid lines in FIG. 6, the flow of beads through inlet 18 resumes when surface 510 passes edge 504 of inlet 18, reaching its maximum when edge 510 reaches edge 506.

Again, the dimensions of the components of apparatus 10, and the operation of pusher 22 and shutter 500 and head 508 should ensure that the front of mold 14 between the forward surface of the pusher head and mass 26 is completely filled before the flow of beads is stopped by the movement of pusher 22.

What is claimed is:

1. Apparatus for continuously molding heat sensitive thermoplastic material into a product, comprising:

a molding chamber that defines an inlet and an outlet;

a feed system that is adapted to feed the material to said molding chamber inlet;

a pusher defining a head that is positioned to push the material, said pusher forcing the material through said molding chamber, the product exiting said molding chamber outlet;

heating apparatus that heats the material in said molding chamber; and a reciprocating system that causes said pusher and said molding chamber to reciprocate relative to each other wherein said reciprocating system reciprocates said molding chamber.

2. Apparatus for continuously molding heat sensitive thermoplastic material into a product, comprising:

a molding chamber with rigid walls that defines an inlet and an outlet and that conforms along its length to the cross sectional shape of the product;

a feed system that is adapted to feed the material to said molding chamber inlet;

a pusher defining a head that is positioned to push the material, said pusher forcing the material through said molding chamber, the product exiting said molding chamber outlet; and heating apparatus associated with said molding chamber that heats the material as it is being pushed through and formed into a formed mass by said molding chamber to fuse said material into a mass that conforms to the cross-sectional shape of said molding chamber;

wherein said molding chamber includes inserts for forming voids in the product.

3. Apparatus for continuously molding heat sensitive thermoplastic material into a product, comprising:

a molding chamber with rigid walls that defines an inlet and an outlet and that conforms along its length to the cross sectional shape of the product;

a feed system that is adapted to feed the material to said molding chamber inlet;

a pusher defining a head that is positioned to push the material, said pusher forcing the material through said molding chamber, the product exiting said molding chamber outlet;

heating apparatus associated with said molding chamber that heats the material as it is being pushed through and formed into a formed mass by said molding chamber to fuse said material into a mass that conforms to the cross-sectional shape of said molding chamber; and cooling apparatus for cooling the material after it has been heated by said heating apparatus, but before it exits said molding chamber.

4. Apparatus for continuously molding heat sensitive thermoplastic material into a product, comprising:

a molding chamber with rind walls that defines an inlet and an outlet and that conforms along its length to the cross sectional shape of the product;

a feed system that is adapted to feed the material to said molding chamber inlet;

a pusher defining a head that is positioned to push the material, said pusher forcing the material through said molding chamber, the product exiting said molding chamber outlet;

heating apparatus associated with said molding chamber that heats the material as it is being pushed through and formed into a formed mass by said molding chamber to fuse said material into a mass that conforms to the cross-sectional shape of said molding chamber, and a system that controls the density of the products produced by said apparatus, wherein said density control system weighs the product and applies a signal related to the product weight to a controller that adjusts the movement of said pusher relative to said molding chamber to achieve the desired density of the product.

5. Apparatus for continuously molding heat expandable particles into a product, comprising:

a molding chamber that defines an inlet and an outlet, said molding chamber being configured to conform to the cross sectional shape of the product;

a feed system that is adapted to deliver heat expandable particles into said molding chamber through said molding chamber inlet;

a pusher defining a head that is positioned to contact the heat expandable particles and force them through said molding chamber;

a conveyor system that cooperates with said pusher to convey the particles through said molding chamber;

a reciprocating system that reciprocates said pusher relative to said molding chamber to force the particles through said molding chamber;

heating apparatus that heats heat expandable particles in said molding chamber; and cooling apparatus that cools the expanded particles after they have been heated and formed to said molding chamber and before they exit said molding chamber;

said product exiting said molding chamber through said molding chamber outlet.

6. Apparatus for continuously molding heat expandable particles into a product comprising:

a molding chamber that defines an inlet and an outlet, said molding chamber including inserts for forming voids in the product, said molding chamber being configured to conform to the cross sectional shape of the product;

a feed system that is adapted to deliver heat expandable particles into said molding chamber through said molding chamber inlet, said feed system including a container that defines an outlet through which the material may pass from within said container, and a valve that controls the passage of material from said container into said molding chamber;

a pusher defining a head that is positioned to contact the heat expandable particles and force them through said molding chamber;

a conveyor system that cooperates with said pusher to convey the particles through said molding chamber;

a reciprocating system that reciprocates said pusher relative to said molding chamber to force the particles through said molding chamber;

heating apparatus that heats heat expandable particles in said molding chamber; and a system that controls the density of the products produced by said apparatus;

said product exiting said molding chamber through said molding chamber outlet.

7. The apparatus recited by claim 6 further comprising a cooling apparatus that cools the expanded particles after they have been heated and formed to said molding chamber and before they exit said molding chamber.

* * * * *